(12) United States Patent
Downs et al.

(10) Patent No.: US 6,327,233 B1
(45) Date of Patent: Dec. 4, 2001

(54) METHOD AND APPARATUS FOR REPORTING PROGRAMMING SELECTIONS FROM COMPACT DISK PLAYERS

(75) Inventors: Terry Downs; Jeremy B. Gaylord, both of Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/132,967

(22) Filed: Aug. 14, 1998

(51) Int. Cl.[7] ........................................ G11B 3/90
(52) U.S. Cl. ................................. 369/53.1; 369/30
(58) Field of Search .................. 369/24, 30, 32, 369/34, 53, 54, 58, 53.1, 53.11, 53.2, 53.37, 53.41, 53.45

(56) References Cited

U.S. PATENT DOCUMENTS

| | | | |
|---|---|---|---|
| 5,237,157 | * 8/1993 | Kaplan | 705/10 X |
| 5,751,672 | * 5/1998 | Yankowski | 369/34 X |
| 5,963,916 | * 10/1999 | Kaplan | 705/26 |
| 6,031,795 | * 2/2000 | Wehmeyer | 369/30 |
| 6,031,797 | * 2/2000 | Van Ryzin et al. | 369/30 X |
| 6,034,925 | * 3/2000 | Wehmeyer | 369/30 |
| 6,111,824 | * 8/2000 | Benson | 369/30 X |

\* cited by examiner

*Primary Examiner*—Paul W. Huber
(74) *Attorney, Agent, or Firm*—Blakely, Sokoloff, Taylor & Zafman LLP

(57) ABSTRACT

A compact disk (CD) player includes CD playing circuitry. A selection monitoring unit is coupled to the CD playing circuitry. The selection monitoring unit transmits selection data that corresponds to a selection played by the CD playing circuitry to a remote system.

29 Claims, 5 Drawing Sheets

METHOD AND APPARATUS FOR REPORTING PROGRAMMING SELECTIONS FROM COMPACT DISK PLAYERS

FIELD OF THE INVENTION

The present invention relates to compact disk players. More specifically, the present invention relates to a method and apparatus for reporting selections played on compact disk players.

BACKGROUND OF THE INVENTION

The music recording industry is a competitive, multi-billion dollar industry. Record companies rely on sales data from music stores and airplay data from radio stations to track the popularity and success of releases from musical artists. The sales and airplay data, however, do not provide information about the type of audience that listens to a release, which tracks on a release are played and the frequency of play by a purchaser, and the names of other releases and musical artists the purchaser listens to. The record companies would be able to use this additional information, for example, to determine the most effective method to promote a musical artist, to project a period of popularity of a musical artist, and to categorize or group musical artists for marketing purposes.

Various techniques are currently available to provide information of this nature. Each of these, however, suffers from various drawbacks. One technique used in the past for gathering additional music listening data involved having an impartial third party conduct interviews with music listeners. This approach, however, required finding music listeners that were willing to participate in sometimes long surveys which may be inconvenient for the participants. A second technique used for gathering music listening data involved having a radio station or record company gather information. This technique found more willing participants, but the results obtained were suspect because of the music listener's inclination to be biased in favor of what is of interest to the interviewer.

SUMMARY

A compact disk (CD) player is disclosed. The CD player includes CD playing circuitry. A selection monitoring unit is coupled to the CD playing circuitry. The selection monitoring unit transmits selection data that corresponds to a selection played by the CD playing circuitry to a remote system.

BRIEF DESCRIPTION OF THE DRAWINGS

The present invention is illustrated by way of example and not by way of limitation in the figures of the accompanying drawings, in which the like references indicate similar elements in and in which:

FIG. 1 is a block diagram that illustrates a network environment in which an embodiment of the present invention is implemented on;

DETAILED DESCRIPTION

Figure 1:
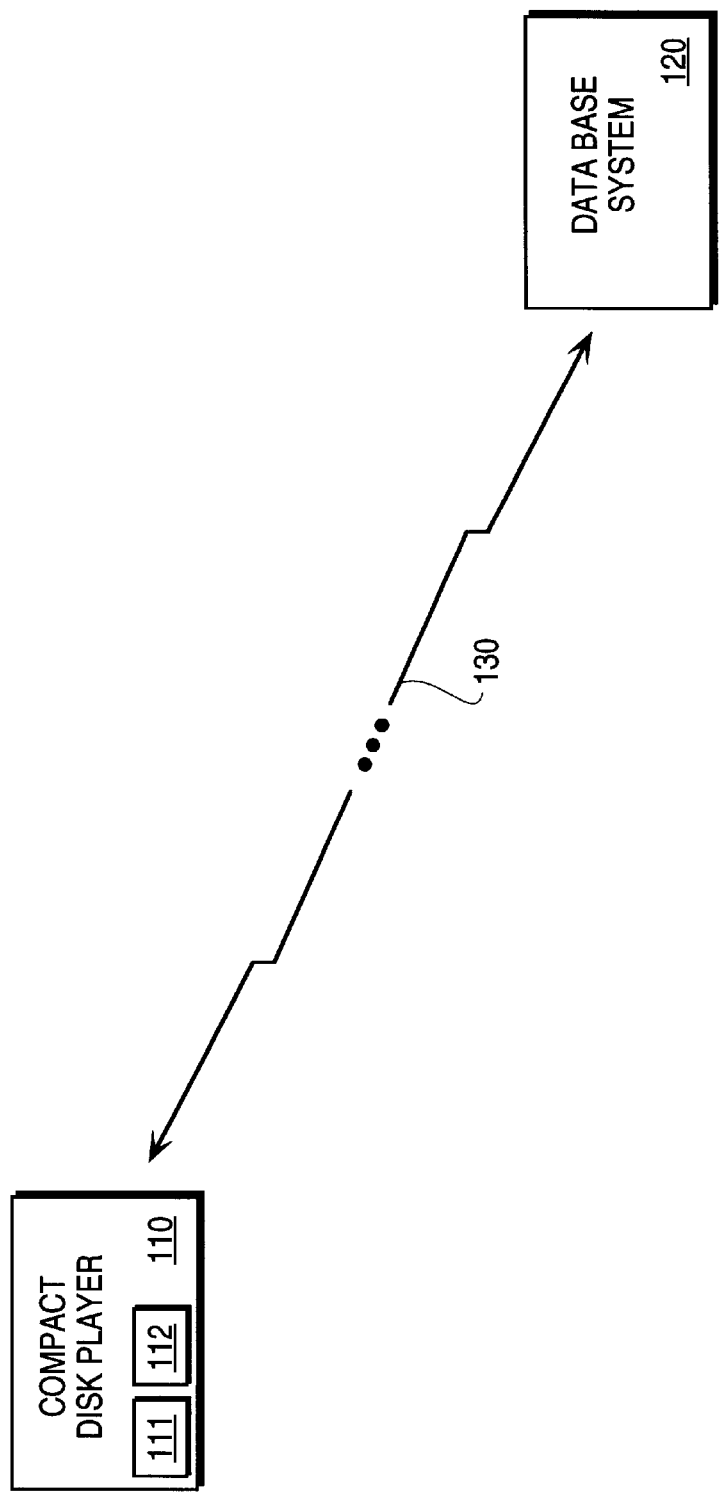

FIG. 1 is a block diagram that illustrates a network 100 in which an embodiment of the present invention is implemented on. The network 100 includes a compact disk (CD) player 110. The CD player 110 may be a single CD, multiple CD, or a juke box CD player. The CD player 110 includes CD playing circuitry 111 that reads CD data on a CD and plays audio data from the CD data on an amplification system (not shown). The CD player 110 also includes a selection monitoring unit 112. The selection monitoring unit 112 is coupled to the CD playing circuitry 111 and may reside internally or externally to the CD player 110. The selection monitoring unit 112 transmits selection data that corresponds to a selection played by the CD playing circuitry 111 to a remote system 120.

The selection data is transmitted to the remote system 120 via transmission medium 130. The transmission medium 130 may be a physical telephone line connection, a cellular phone connection, an Internet connection, a combination of these connections, or other connections. The remote system 120 may be for example a computer system with a data base that stores the selection data.

Figure 2:
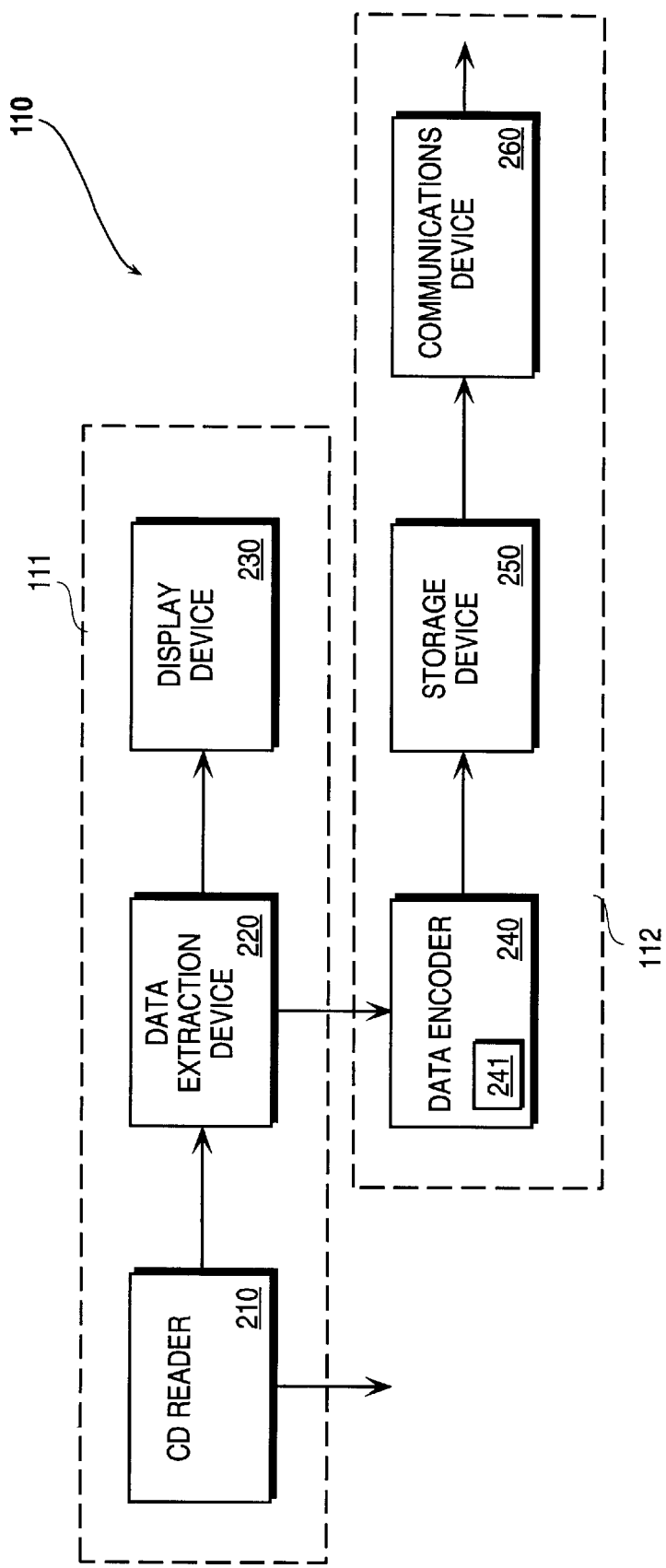
FIG. 2 is a block diagram that illustrates a compact disk player according to an embodiment of the present invention.

FIG. 2 is a block diagram of the CD player 110 according to an embodiment of the present invention. The CD player 110 includes CD playing circuitry 111 and selection monitoring unit 112. The CD playing circuitry 111 includes a CD reader 210. The CD reader 210 operates to read CD data written on a CD selected to be played. The CD reader 210 may include a focused laser beam that monitors fluctuations of reflected intensity on the CD. The fluctuations of reflected intensity are encoded data bits on the CD.

A data extraction device 220 is coupled to the CD reader 210. The data extraction device 220 extracts non-audio CD data from the CD data. According to an embodiment of the present invention, the data extraction device 220 reads a designated section in the sectors of the CD to obtain the non-audio CD data. Most CDs have designated bits that are left blank in each sector. These designated bits may be used to store information. CD+G formatting, for example, uses these designated bits to store graphics information. CD-TEXT formatting uses these designated bits to store textual information. The designated bits allows recording companies to encode information such as an identifier that identifies each selection on the CD or other information with the selection. The identifier may be for example a name of the musical artist, title of the CD, and the title of the song.

Figure 3:
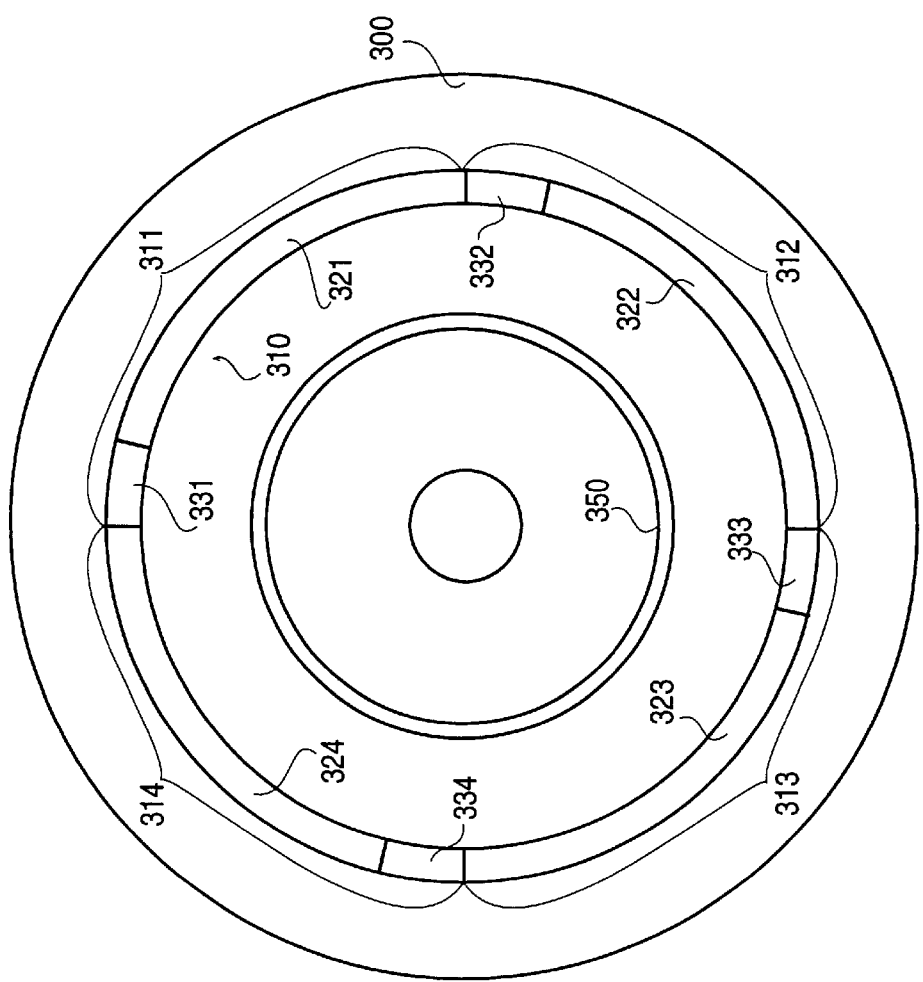
FIG. 3 illustrates a compact disk that stores non-audio CD data interleaved with audio CD data.

FIG. 3 illustrates a CD 300 according to an embodiment of the present invention. The CD 300 is a plastic substrate embossed with a pattern of bits that encode audio signals in digital format. The CD is coated with a metallic layer (not shown) to enhance its reflectivity. The CD 300 includes a plurality of tracks 310 and 350 that store data bits written on the CD sequentially. Typically, each selection on a CD is written on its own track.

Tracks are divided into a plurality of contiguous sectors that typically store 512 or 1024 bytes of data. The track 310 is shown to have sectors 311–314. Each sector includes a section having a plurality of bits or bytes that may be used to store audio data. For example, section 321 of sector 311, section 322 of sector 312, section 323 of sector 312, and section 324 of sector 314 may be used to store audio data. Each sector includes a section having a plurality of bits or bytes that are reserved for storing non-audio data. For example, section 331 of section 311, section 332 of sector 312, section 333 of sector 313, and section 334 of sector 314 may be used to store non-audio data. The CD 300 is formatted such that non-audio CD data may be interleaved with audio CD data. According to an embodiment of the present invention, the data extraction unit 220 reads the reserved sections of sectors on a track to obtain non-audio CD data corresponding to a selection selected to be played.

Referring back to FIG. 2, a display device 230 is coupled to the data extraction device 220. The display device 220 displays the non-audio CD data received from the data extraction device 220. By displaying the identifier of a selection to a user of the CD player 110, the user may use the information to determine whether to listen to the selection or to choose another selection. The display device 230 may be a liquid crystal display (LCD), a cathode ray tube (CRT) display, or other display.

The selection monitoring unit 112 is coupled to the CD playing circuitry 111. The selection monitoring unit 112 includes a data encoder 240. The data encoder 240 receives the non-audio CD data from the data extraction device 220. The data encoder 240 encodes a time which the selection was played with the non-audio CD data as selection data. The data encoder 240 may also encode addition information into the selection data such as demographic information belonging to the user of the CD player. For example, the data encoder 240 may encode name, age, address, or other information belonging to the user that may be inputted into the CD player 110 by the user.

According to an embodiment of the present invention, the data encoder 240 includes a coding unit 241. The coding unit 241 codes the selection data into a format that requires less bandwidth to transmit on the transmission medium 130 (shown in FIG. 1). The coding unit 241 may implement a coding scheme understood by the remote system 120 where non-audio CD data such as names of musical artists, titles of CD, and titles of songs may be expressed with a predefined code that may be periodically updated.

A storage device 250 is coupled to the data encoder 240. The storage device 250 receives the selection data from the data encoder 240. The storage device 250 keeps a log of the selections played by the CD player 110 by recording the selection data generated by the data encoder 240. The storage device 250 may be, for example, a dynamic random access memory (DRAM) or other memory device.

A communications device 260 is coupled to the storage device 250. The communications device 250 receives the selection data from the storage device and transmits the selection data to the remote system 120 via the transmission medium 130. The communications device 250 may send the selection data to the remote system 120 as it is generated or the communications device 250 may transmit a log of stored selection data to the remote system 120 after a determined period of time has expired. The communications device 260 may include a modem that transmits the selection data over a transmission medium that is a physical telephone line connection or a cellular phone connection. According to an alternative embodiment of the present invention, the communications device 260 may include an interface to a computer system (not shown) that may be used to transmit the selection data to the remote computer system 120. The interface may be for example a serial cable connection, an optical connection, or other interface.

The CD reader 210, data extraction device 220, display device 230, data encoder 240, storage device 250, and the communications device 260 may be implemented using any known circuitry or technique. It should be appreciated that the CD reader 210, data extraction device 220, display device 230, data encoder 240, storage device 250, and the communications device 260 may be connected together in other combinations. For example, the storage device 250 may be coupled to the data extraction device 220 and the data encoder 240 may be coupled to the communications device 260.

Figure 4:
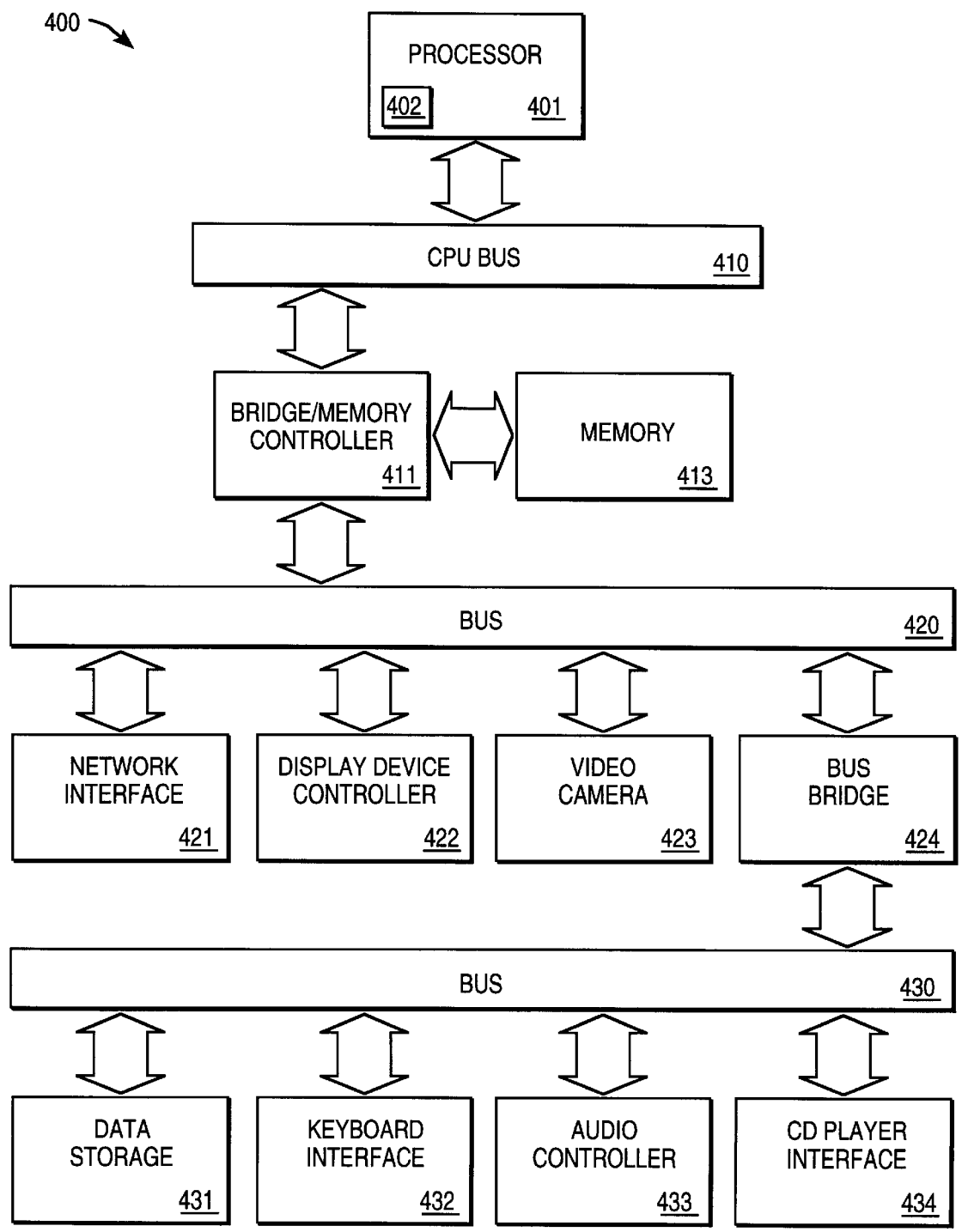
FIG. 4 is a block diagram of a computer system according to an embodiment of the present invention.

FIG. 4 illustrates a computer system 400 which may be used to transmit the selection data to the remote computer system 120. The computer system 400 includes a processor 401 that processes data signals. The processor 401 may be a complex instruction set computer (CISC) microprocessor, a reduced instruction set computing (RISC) microprocessor, a very long instruction word (VLIW) microprocessor, a processor implementing a combination of instruction sets, or other processor device. FIG. 4 shows an example of the present invention implemented on a single processor computer system 400. However, it is understood that the present invention may be implemented in a computer system having multiple processors. The processor 401 is coupled to a CPU bus 410 that transmits data signals between processor 401 and other components in the computer system 400.

The computer system 400 includes a memory 413. The memory 413 may be a dynamic random access memory (DRAM) device, a synchronous dynamic random access memory (SDRAM) device, or other memory device. The memory 413 may store instructions and code represented by data signals that may be executed by the processor 401.

A cache memory 402 resides inside processor 401 that stores data signals stored in memory 413. The cache 402 speeds up memory accesses by the processor 401 by taking advantage of its locality of access. In an alternate embodiment of the computer system 400, the cache 402 resides external to the processor 401.

A bridge memory controller 411 is coupled to the CPU bus 410 and the memory 413. The bridge memory controller 411 directs data signals between the processor 401, the memory 413, and other components in the computer system 400 and bridges the data signals between the CPU bus 410, the memory 413, and a first I/O bus 420.

The first I/O bus 420 may be a single bus or a combination of multiple buses. As an example, the first I/O bus 420 may comprise a Peripheral Component Interconnect (PCI) bus, a Personal Computer Memory Card International Association (PCMCIA) bus, a NuBus, or other buses. The first I/O bus 420 provides communication links between components in the computer system 400. A network interface 421 is coupled to the first I/O bus 420. The network interface 421 links the computer system 400 to a network of computers (not shown in FIG. 4) and supports communication among the machines. According to an embodiment of the present invention, the network interface 421 may be a modem that connects the computer system 400 to the remote system 120 via the transmission medium 150. The network interface 421 may be for example a telephone modem, cable modem, ISDN modem or other type of network interface.

A display device controller 422 is coupled to the first I/O bus 420. The display device controller 422 allows coupling of a display device (not shown) to the computer system 400 and acts as an interface between the display device and the computer system 400. The display device controller 422 may be a monochrome display adapter (MDA) ard, a color graphics adapter (CGA) card, an enhanced graphics adapter (EGA) card, an extended graphics array (XGA) card or other display device controller. The display device may be a television set, a computer monitor, a flat panel display or other display device. The display device receives data signals from the processor 401 through the display device controller 422 and displays the information and data signals to the user of the computer system 400. A video camera 423 is coupled to the first I/O bus 420.

A second I/O bus 430 may be a single bus or a combination of multiple buses. As an example, the second I/O bus 430 may comprise a PCI bus, a PCMCIA bus, a NuBus, an Industry Standard Architecture (ISA) bus, or other buses. The second I/O bus 430 provides communication links between components in the computer system 400. A data storage device 431 is coupled to the second I/O bus 430. The data storage device 431 may be a hard disk drive, a floppy disk drive, a CD-ROM device, a flash memory device or other mass storage device.

A keyboard interface 432 is coupled to the second I/O bus 430. The keyboard interface 432 may be a keyboard controller or other keyboard interface. The keyboard interface 432 may be a dedicated device or can reside in another device such as a bus controller or other controller. The keyboard interface 432 allows coupling of a keyboard (not shown) to the computer system 400 and transmits data signals from a keyboard to the computer system 400. An audio controller 433 is coupled to the second I/O bus 430. The audio controller 433 operates to coordinate the recording and playing of sounds is also coupled to the I/O bus 430.

A CD player interface 434 is coupled to the second I/O bus. The CD player interface 434 receives selection data from the communications device 260. The CD player interface 434 may be, for example, a port that receives a serial cable connection, an optical connection, or other connection. Selection data received from the CD player interface 434 is transmitted to the remote system 120 via the network interface 421.

A bus bridge 424 couples the first I/O bus 420 to the second I/O bus 430. The bus bridge 424 operates to buffer and bridge data signals between the first I/O bus 420 and the second I/O bus 430.

Figure 5:
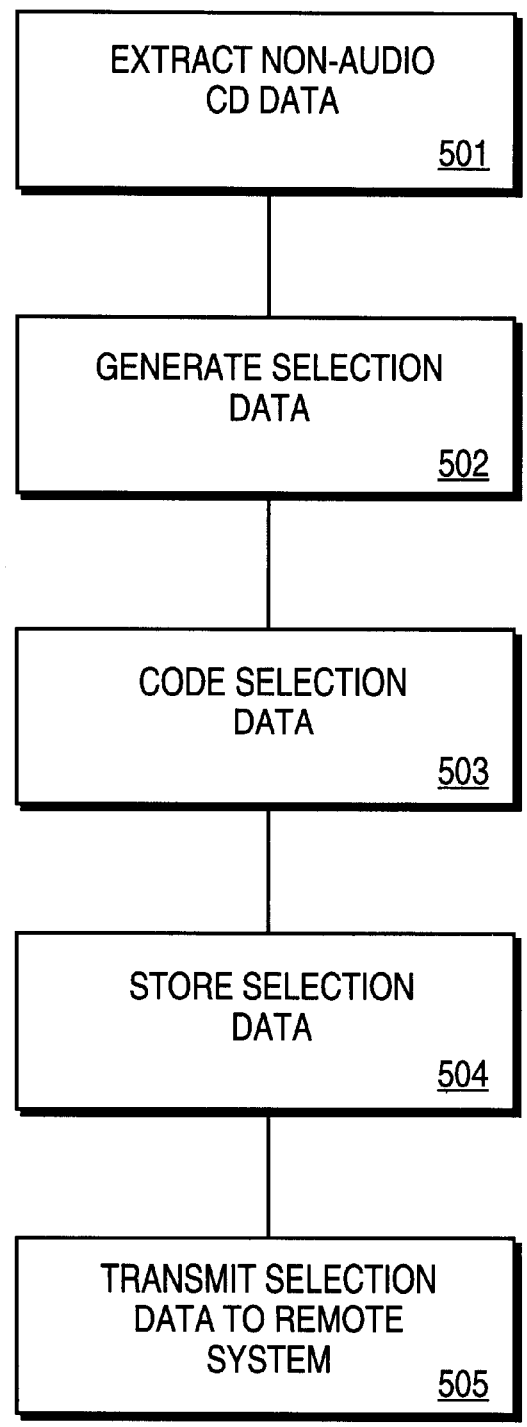
FIG. 5 is a flow chart that illustrates a method for managing compact disk data according to an embodiment of the present invention.

FIG. 5 is a flow chart that illustrates a method for managing CD data that corresponds to a selection played on a CD player. At step 501, non-audio CD data is extracted from CD data corresponding to a selection played on the CD player. According to an embodiment of the present invention, extracting non-audio CD data from the CD data may be achieved by reading information stored in designated reserved bits in audio sectors corresponding to the selection.

At step 502, selection data is generated that includes a time when the selection was played and the non-audio CD data. The non-audio CD data may include an identifier of the selection played such as the name of the musical artist, the title of the release, and the title of the selection.

At step 503, the selection data is coded into a format that requires less bandwidth to transmit. The format may be one that is readable and decodable by the remote computer system.

At step 504, the selection data is stored in a storage medium. The storage medium may be used to keep a log of selections played by the CD player during a defined period of time.

At step 505, the selection data is transmitted to a remote system. The selection data may be transmitted as it is generated or the selection data may be transmitted together with other selection data in the log kept by the storage medium. According to a first embodiment of the present invention the selection data is transmitted to the remote system via a telephone connection. According to a second embodiment of the present invention, the selection data is transmitted to the remote system via a cellular phone connection. According to a third embodiment of the present invention, the selection data is transmitted to the remote system via a network connection.

It should appreciated that the steps described for managing CD data that corresponds to a selection played on a CD player may be performed in other orders. For example, the selection data may be coded after they are stored in the storage medium. It should also be appreciated that according to some embodiments of the present invention, not all of the steps need to be performed. For example, in an embodiment of the present invention where the selection data is transmitted to the remote system as it is generated, the selection data need not be stored in the storage medium so to be later transmitted in a log.

In the foregoing description, the invention is described with reference to specific exemplary embodiments thereof. It will, however, be evident that various modifications and changes may be made thereto without departing from the broader spirit and scope of the present invention as set forth in the appended claims. The specification and drawings are to be regarded in an illustrative rather than a restrictive sense.

What is claimed is:

1. A compact disk (CD) player, comprising:
   CD playing circuitry; and
   a selection monitoring unit, coupled to the CD playing circuitry, that monitors user interactions with the CD player and transmits corresponding selection data to a remote system, the user interactions including information indicative of a selection to be played by the CD playing circuitry, the selection data including non-audio CD data extracted from a CD containing the selection.

2. The CD player of claim 1, wherein the CD playing circuitry comprises:
   a CD reader that reads CD data corresponding to the selection on a CD;
   a data extraction device, coupled to the CD reader, that extracts non-audio CD data from the CD data; and
   a display device, coupled to the data extraction device, that displays the non-audio CD data.

3. The CD player of claim 1, wherein the selection monitoring unit comprises:
   a data encoder that encodes a time the selection was played with the non-audio CD data and corresponding user demographic data as selection data;
   a storage device, coupled to the data encoder, that stores the selection data; and
   a communication device, coupled to the storage device, that transmits the selection data to the remote system.

4. The CD player of claim 3, wherein the data encoder includes a coding unit that codes the selection data in a format that requires less bandwidth to transmit.

5. The CD player of claim 3, wherein the communications device is a modem.

6. The CD player of claim 3, wherein the communications device comprises:
   a computer system interface; and
   a computer system, coupled to the computer system interface, having a network connection.

7. The CD player of claim 6, wherein the computer system interface comprises a serial connection.

8. The compact disk (CD) player of claim 1, wherein the selection data comprises a time at which the selection was played by the CD playing circuitry.

9. The compact disk (CD) player of claim 1, wherein the selection data includes user demographic data.

10. A computer system, comprising:

a bus;

a processor coupled to the bus;

a compact disk (CD) player, coupled to the bus, that includes CD playing circuitry, and a selection monitoring unit, coupled to the CD playing circuitry, that monitors user interactions with the CD player and transmits corresponding selection data to a remote system, the user interactions including information indicative of a selection to be played by the CD playing circuitry, the selection data including non-audio CD data extracted from a CD containing the selection.

11. The computer system of claim 10, wherein the CD playing circuitry comprises:

a CD reader that reads CD data corresponding to the selection on a CD;

a data extraction device, coupled to the CD reader, that extracts non-audio CD data from the CD data; and a display device, coupled to the data extraction device, that displays the non-audio CD data.

12. The computer system of claim 10, wherein the selection monitoring unit comprises:

a data encoder that encodes a time the selection was played with the non-audio CD data and corresponding user demographic data as selection data;

a storage device, coupled to the data encoder, that stores the selection data; and a communications device, coupled to the storage device, that transmits the selection data to the remote system.

13. The computer system of claim 10, wherein the selection data comprises a time at which the selection was played by the CD playing circuitry.

14. The computer system of claim 10, wherein the selection data includes user demographic data.

15. A method for managing compact disk (CD) data that corresponds to a selection played on a CD player, comprising:

monitoring user interaction with the CD player, the user interaction including information indicative of a selection to be played by the CD player; and transmitting corresponding selection data to a remote system, the selection data including non-audio CD extracted from a CD containing the selection.

16. The method of claim 15, wherein extracting non-audio CD data from the CD data comprises reading information stored in reserved bits of audio sectors corresponding to the selection.

17. The method of claim 15, wherein transmitting the selection data comprises sending the selection data via a telephone line.

18. The method of claim 15, wherein transmitting the selection data comprises sending the selection data via a cellular communications medium.

19. The method of claim 15, wherein transmitting the selection data comprises sending the selection data via a network connection.

20. The method of claim 15, further comprising the step of encoding a time the selection was played with the non-audio CD data as selection data.

21. The method of claim 15, further comprising the step of encoding a time the selection was played with the non-audio CD data into a format that requires less space.

22. The method of claim 20, further comprising the step of storing the selection data with other selection data in a log.

23. The method of claim 15, wherein the selection data comprises a time at which the selection was played by the CD playing circuitry.

24. The method of claim 15, wherein the selection data includes user demographic data.

25. A method comprising:

extracting selection data comprising non-audio compact disk (CD) data, for a selection played by a CD player; and transmitting the selection data and the corresponding user demographic data to a remote system to facilitate usage pattern tracking.

26. The method of claim 25 further comprising:

encoding said selection data; and storing said selection data.

27. The method of claim 26, wherein the encoding said selection data further comprises coding the selection data in a format that requires less bandwidth to transmit.

28. The method of claim 25, wherein the non-audio CD data includes CD-identifying data.

29. The method of claim 25, wherein the user demographic data includes user-identifying data.

* * * * *